United States Patent
Mohebbinia et al.

(10) Patent No.: US 10,900,330 B2
(45) Date of Patent: Jan. 26, 2021

(54) SELECTIVE DIFFUSION INCLUSION FOR A RESERVOIR SIMULATION FOR HYDROCARBON RECOVERY

(71) Applicant: Landmark Graphics Corporation, Houston, TX (US)

(72) Inventors: Saeedeh Mohebbinia, Houston, TX (US); Terry Wayne Wong, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 16/334,416

(22) PCT Filed: Aug. 2, 2017

(86) PCT No.: PCT/US2017/045071
§ 371 (c)(1),
(2) Date: Mar. 19, 2019

(87) PCT Pub. No.: WO2018/089059
PCT Pub. Date: May 17, 2018

(65) Prior Publication Data
US 2019/0218895 A1    Jul. 18, 2019

Related U.S. Application Data

(60) Provisional application No. 62/419,230, filed on Nov. 8, 2016, provisional application No. 62/419,257, filed on Nov. 8, 2016.

(51) Int. Cl.
*E21B 41/00* (2006.01)
*E21B 49/00* (2006.01)
(Continued)

(52) U.S. Cl.
CPC ........ *E21B 41/0092* (2013.01); *E21B 43/166* (2013.01); *E21B 43/168* (2013.01);
(Continued)

(58) Field of Classification Search
CPC .... E21B 41/0092; E21B 43/26; E21B 43/166; E21B 43/168; E21B 49/00; G06F 9/455; G06F 2111/10; G06F 30/20
See application file for complete search history.

(56) References Cited

U.S. PATENT DOCUMENTS 6,283,212 B1 * 9/2001 Hinkel .................. C09K 8/64
166/279
8,150,669 B2 * 4/2012 Cacas .................. G01V 99/00
345/423

(Continued)

OTHER PUBLICATIONS

PCT International Application Serial No. PCT/US2017/045071; International Search Report dated Nov. 9, 2017, 3 pages.
(Continued)

*Primary Examiner* — Aaron L Lembo
(74) *Attorney, Agent, or Firm* — Gilliam IP PLLC (57) ABSTRACT

A method includes creating a diffusion model for a simulation of hydrocarbon recovery from a reservoir having a plurality of fractures during injection of an injected gas into the plurality of fractures, wherein the reservoir is partitioned into a plurality of grid cells in the diffusion model. Creating the diffusion model for a grid cell of the plurality of grid cells comprises, determining a flux ratio of a convective flux to an estimated diffusive flux for the grid cell, determining whether the flux ratio is less than a threshold, and in response to determining that the flux ratio is less than the threshold, determining a full diffusive flux for the grid cell for inclusion in the diffusion model. The method also includes performing the simulation of the hydrocarbon recovery from the reservoir based on the diffusion model.

20 Claims, 4 Drawing Sheets

(51) Int. Cl.
  *G06F 9/455* (2018.01)
  *E21B 43/16* (2006.01)
  *G06F 30/20* (2020.01)
  *G06F 111/10* (2020.01)
  *E21B 43/26* (2006.01)

(52) U.S. Cl.
  CPC ............... *E21B 49/00* (2013.01); *G06F 9/455* (2013.01); *G06F 30/20* (2020.01); *E21B 43/26* (2013.01); *G06F 2111/10* (2020.01)

(56) References Cited

U.S. PATENT DOCUMENTS

| | | | | |
|---|---|---|---|---|
| 8,321,190 | B2* | 11/2012 | Hansen | G06F 30/20 703/10 |
| 9,863,885 | B2* | 1/2018 | Zaretski | C23C 14/04 |
| 10,366,185 | B2* | 7/2019 | Lin | G06F 30/23 |
| 10,551,520 | B2* | 2/2020 | Saidian | G01N 24/081 |
| 2003/0060988 | A1* | 3/2003 | Ginzburg | G06F 30/23 702/50 |
| 2006/0020438 | A1 | 1/2006 | Huh et al. | |
| 2011/0060563 | A1 | 3/2011 | Guenther et al. | |
| 2012/0221302 | A1 | 8/2012 | Lewandowski et al. | |
| 2015/0066445 | A1 | 3/2015 | Lin et al. | |
| 2015/0066457 | A1 | 3/2015 | Wu et al. | |
| 2016/0063150 | A1* | 3/2016 | Safonov | E21B 25/00 703/10 |
| 2016/0305237 | A1* | 10/2016 | Klemin | E21B 43/00 |
| 2018/0058211 | A1* | 3/2018 | Liang | E21B 49/00 |
| 2018/0253519 | A1* | 9/2018 | Filippov | G01V 99/005 |
| 2018/0329112 | A1* | 11/2018 | Lee | E21B 49/08 |
| 2018/0347328 | A1* | 12/2018 | Aguilera | E21B 43/18 |
| 2019/0331812 | A1* | 10/2019 | Liu | G01V 99/005 |

OTHER PUBLICATIONS

PCT International Application Serial No. PCT/US2017/045071; Written Opinion dated Nov. 9, 2017, 5 pages.

* cited by examiner

SELECTIVE DIFFUSION INCLUSION FOR A RESERVOIR SIMULATION FOR HYDROCARBON RECOVERY

BACKGROUND

The disclosure generally relates to data processing for hydrocarbon recovery, and more particularly, to reservoir simulation for hydrocarbon recovery.

Reservoir simulations can predict the flow and phase behavior of the fluids in a reservoir to forecast production and injection quantities that include incremental hydrocarbon recovery, miscible-solvent requirement, solvent utilization efficiency, etc. Simulations can assist to evaluate the enhanced oil recovery (EOR) processes including gas injection and chemical flooding. Gas injection in general can be a good option for EOR, particularly for fractured reservoirs, where there is a large contact area between the injected gas and fluid in place.

During gas injection recovery schemes, pressurized gas or fluid can be communicated from a wellbore into the reservoir at high pressure, and the pressurized gas displaces oil within the reservoir rock. The displaced oil and the injected gas can then be produced in production wellbores. Building a reliable compositional model to represent these processes requires special features in the simulation, such as models for molecular diffusion between the injected gas inside fractures and the fluids stored in the reservoir rock. However, the accurate calculation of the molecular diffusion is usually an expensive and complicated process during simulation.

BRIEF DESCRIPTION OF THE DRAWINGS

Embodiments of the disclosure can be better understood by referencing the accompanying drawings.

DESCRIPTION

The description that follows includes example systems, methods, techniques, and program flows that embody aspects of the disclosure. However, it is understood that this disclosure can be practiced without these specific details. In other instances, well-known structures and techniques have not been shown in detail in order not to obfuscate the description.

Various embodiments relate to simulations of recovery of oil from petroleum reservoirs. Some embodiments include operations for reducing time to calculate the molecular diffusion in a reservoir simulation of gas injections in fractured media, in order to reduce the total execution time of the simulation. Molecular diffusion can play an important role in the hydrocarbon recovery from fractured reservoirs. Molecular diffusion can include any thermal motion of particles (including liquid and gas) at temperatures above absolute zero. Molecular diffusion can be an important factor in the hydrocarbon recovery for gas injections when gravitational drainage is inefficient. An effective flux between fractures and matrix blocks can be driven due to compositional gradients. Also, diffusion of light components into the oil phase can cause favorable changes in the fluid properties such as viscosity reduction and swelling of the oil in the matrix. Ignoring diffusion in the simulation can lead to an underestimation of the hydrocarbon recovery. Without diffusion, the injected gas flows mostly through the fractures, which causes early breakthrough. In some embodiments, a simulated volume of the reservoir can be partitioned into a number of grid cells that can interact with each other at their grid cell faces as part of performing diffusion calculations.

Existing models for diffusion are either simple constant coefficient models that cannot capture the physics properly or sophisticated expensive models which can have high computational cost for real-life problems. Some embodiments provide a procedure to decrease the amount of time to perform diffusion calculations without loss of accuracy. Operations to speed up diffusion calculations can be particularly useful for field cases using large number of components in the simulations. Bypassing or skipping unnecessary diffusion calculations is especially important because there can be regions in which there is not a big contrast of compositions between neighboring grid cells.

Diffusion calculations can involve numerous matrix operations, including the calculations of diffusion coefficients, fluxes, and the derivatives of the flux terms. Performing these operations for each grid cell of a reservoir to be simulated can be very time consuming. Diffusion can be negligible for some grid cells which are not in contact with injected fluid or for those that are completely swept by the solvent and have nothing left for mass exchange. Also, for heterogeneous reservoirs with different matrix and fracture properties, there can be regions with different flow regimes from diffusion-dominated (mainly near fractures) to convection-dominated (far from fractures). Performing diffusion calculations for grid cells with negligible diffusion and/or convection-dominated grid cells only causes more complexity and more execution time during the simulation.

In some embodiments, a reservoir simulation dynamically tracks the zones at which diffusion is an effective mass transfer mechanism and avoids unnecessary diffusion calculations in the regions that diffusion is negligible compared to convection. The most active area at which the maximum diffusive mass transfer occurs can be around the fluid front, where the driving forces are at maximum strength because of the large difference in fluid properties. The fluid front has a transition zone, where the composition changes from the composition of the injected fluid to those of the fluid in place. The extent of the transition zone depends on the fluid and porous media properties. Large diffusivities can result in the farther propagation of molecules and therefore cause a larger transition zone. Conversely, if the bulk velocity is very large, the time available for molecules to propagate can be small and therefore the effect of diffusion becomes insignificant. Therefore, the extension of the transition zone can be correlated to the ratio of the convective flux to diffusive flux, which is the definition of a Péclet number.

In some embodiments, a result of the reservoir simulation can be used during an actual hydrocarbon recovery operation. For example, locations of either or both a gas injection well or a production well can be determined based on a result of the reservoir simulation. Additionally, either or both a rate and composition of an injection gas to be injected down the gas injection well during the hydrocarbon recovery operation can be based on result of the reservoir simulation.

Example System

Figure 1:
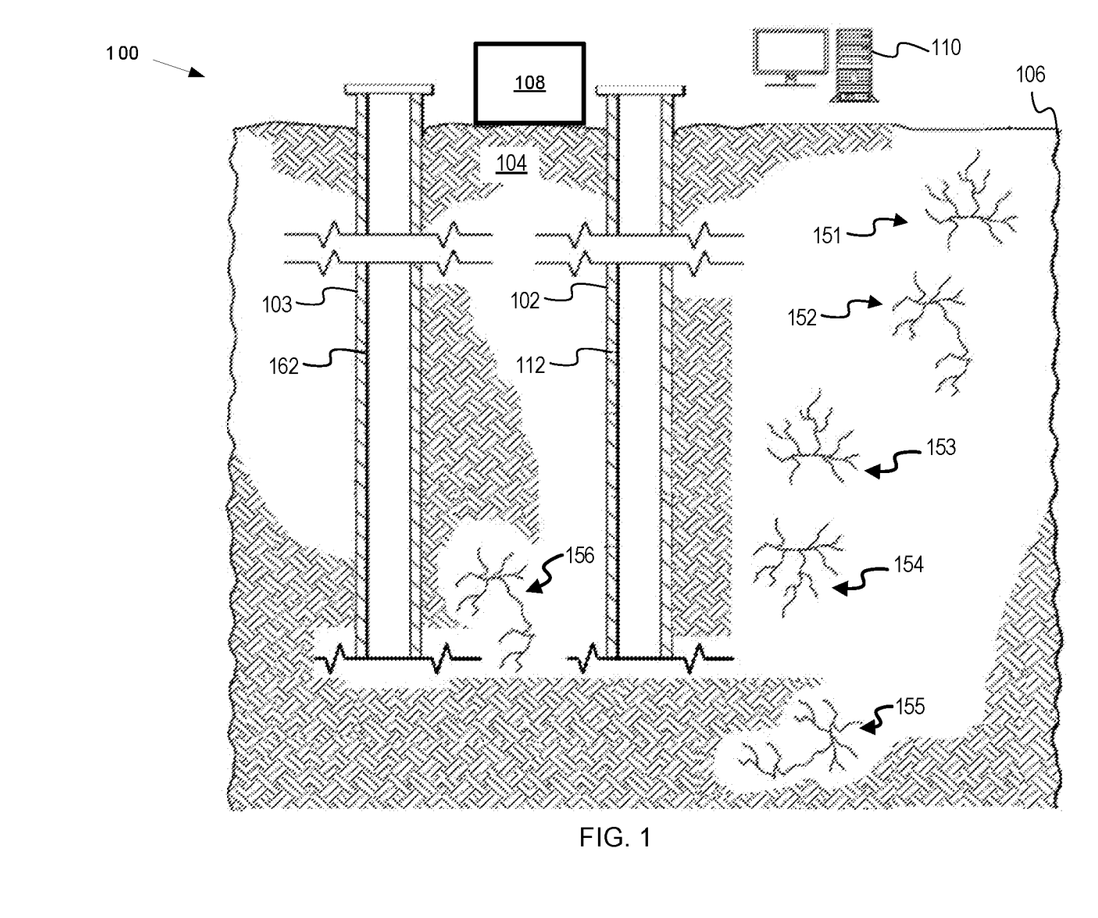
FIG. 1 depicts a schematic diagram of an example well system and a computing subsystem, according to some embodiments.

FIG. 1 depicts a schematic diagram of an example well system and a computing subsystem, according to some embodiments. A well system 100 includes an injection well 102 and a production well 103 in a subterranean region 104 beneath the ground surface 106. The injection well 102 and the production well 103 shown in FIG. 1 are depicted as vertical wellbores. However, some embodiments can be incorporated into well systems that include any combination of horizontal, vertical, slanted, curved, or other wellbore orientations. Also, while depicted with only one injection well and one production well, the well system 100 can include one or more additional treatment wells, observation wells, production wells, etc.

The computing subsystem 110 can include one or more computing devices or systems located at the injection well 102 and the production well 103 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system 100 can be arranged as shown in FIG. 1 or in another configuration.

The subterranean region 104 can include a reservoir that contains hydrocarbon resources such as oil, natural gas, or others. For example, the subterranean region 104 can include all or part of a rock formation (e.g., shale, coal, sandstone, granite, or others) that contain natural gas. The subterranean region 104 can include naturally fractured rock or natural rock formations that are not fractured to any significant degree. The subterranean region 104 can include tight gas formations that include low permeability rock (e.g., shale, coal, or others).

The well system 100 shown in FIG. 1 includes an injection system 108. The injection system 108 can be used to perform an injection treatment whereby a gas is injected into the subterranean region 104 in the injection well 102. For example, the injection system 108 can include an injection pump to inject treatment gas into the subterranean region 104 in the injection well 102. For example, a gas injection displacement process can be applied at a single injection location or at multiple injection locations in a subterranean zone, and the gas can be injected over a single time period or over multiple different time periods. In some instances, a gas injection recovery scheme can use multiple different gas injection locations in a single wellbore, multiple gas injection locations in multiple different wellbores, or any suitable combination thereof. Moreover, the gas injection recovery scheme can inject gas through any suitable type of wellbores such as, for example, vertical wellbores, slanted wellbores, horizontal wellbores, curved wellbores, or combinations of these and others.

In response to the injection of treatment gas into the injection well 102 and because of a potential gradient, reservoir fluids can flow into the production well 103 through a production conduit 162. The reservoir fluids can then be recovered from the production well 103. Although not shown, the well system 100 can also include production control systems and surface facilities to recover and process the reservoir fluids from the production well 103. The well system 100 can also include surface separation facilities, pipelines, storage facilities, etc. for further processing, storage, and transport of the reservoir fluids recovered from the production well 103. Additionally, the well system 100 can produce reservoir fluids and inject gas from multiple locations in the subterranean zone. Also, the production can occur at any point before, during, and after the injection of treatment gas. The production can also occur from multiple zones within the same wellbore. Additionally, while the well system 100 depicts a single production well, production can also occur from any combination of vertical, deviated, and horizontal wells.

Gas can be supplied from a truck with a compressor, or from a gas pipeline and surface compressor facilities. The treatment gas can be communicated through the injection well 102 from the ground surface 106 by an injection conduit 112 installed in the injection well 102. The production conduit 162 and the injection conduit 112 can include casing cemented to the wall of the injection well 102. In some implementations, all or a portion of the injection well 102 can be left open, without casing. The production conduit 162 and the injection conduit 112 can include a working string, coiled tubing, sectioned pipe, or other types of conduit.

The injection system 108 can also include surface and down-hole sensors to measure pressure, rate, temperature or other parameters of treatment or production. For example, the injection system 108 can include pressure meters or other equipment that measure the pressure in the injection well 102 at or near the ground surface 106 or at other locations. The injection system 108 can include pump controls or other types of controls for starting, stopping, increasing, decreasing or otherwise controlling pumping as well as controls for selecting or otherwise controlling gas pumped during the injection treatment. The injection system 108 can include an injection treatment control subsystem for communicating with the equipment to monitor and control the injection treatment.

The subterranean region 104 can include the natural fractures 151-156. Alternatively or in addition, a fluid injection treatment can also create fractures in the subterranean region 104, or further stimulate the natural fractures 151-156. Generally, the fractures can include fractures of any type, number, length, shape, geometry or aperture. Fractures can extend in any direction or orientation, and they can be formed at multiple stages or intervals, at different times or simultaneously. Fractures can extend through naturally fractured rock, regions of un-fractured rock, or both. The fractures can also be connected to the production system and can be the main conduit for production from the reservoir to the production wellbores.

In some implementations, the computing subsystem 110 can execute instructions to simulate the petroleum reservoir in the well system 100 during gas injection operations. The computing subsystem 110 can perform simulations before, during, or after the injection treatment. In some implementations, the injection treatment control subsystem controls the injection treatment based on simulations performed by the computing subsystem 110. For example, a pumping schedule or other aspects of a gas injection plan can be generated in advance based on simulations performed by the computing subsystem 110. As another example, the injection treatment control subsystem can modify, update, or generate a gas injection plan based on simulations performed by the computing subsystem 110 in real time during the injection treatment. In some implementations, the production control subsystem can control the production of existing wells, and the workover treatment of existing wells, and the drilling of new wells.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can perform the compositional reservoir simulation based on the measured data. In some cases, the injection treatment control subsystem can select or modify (e.g., increase or decrease) gas pressures, gas densities, gas compositions, and other control parameters based on data provided by the simulations. In some instances, data provided by the simulations can be displayed in real time during the injection treatment, for example, to an engineer or other operator of the well system 100.

Figure 2:
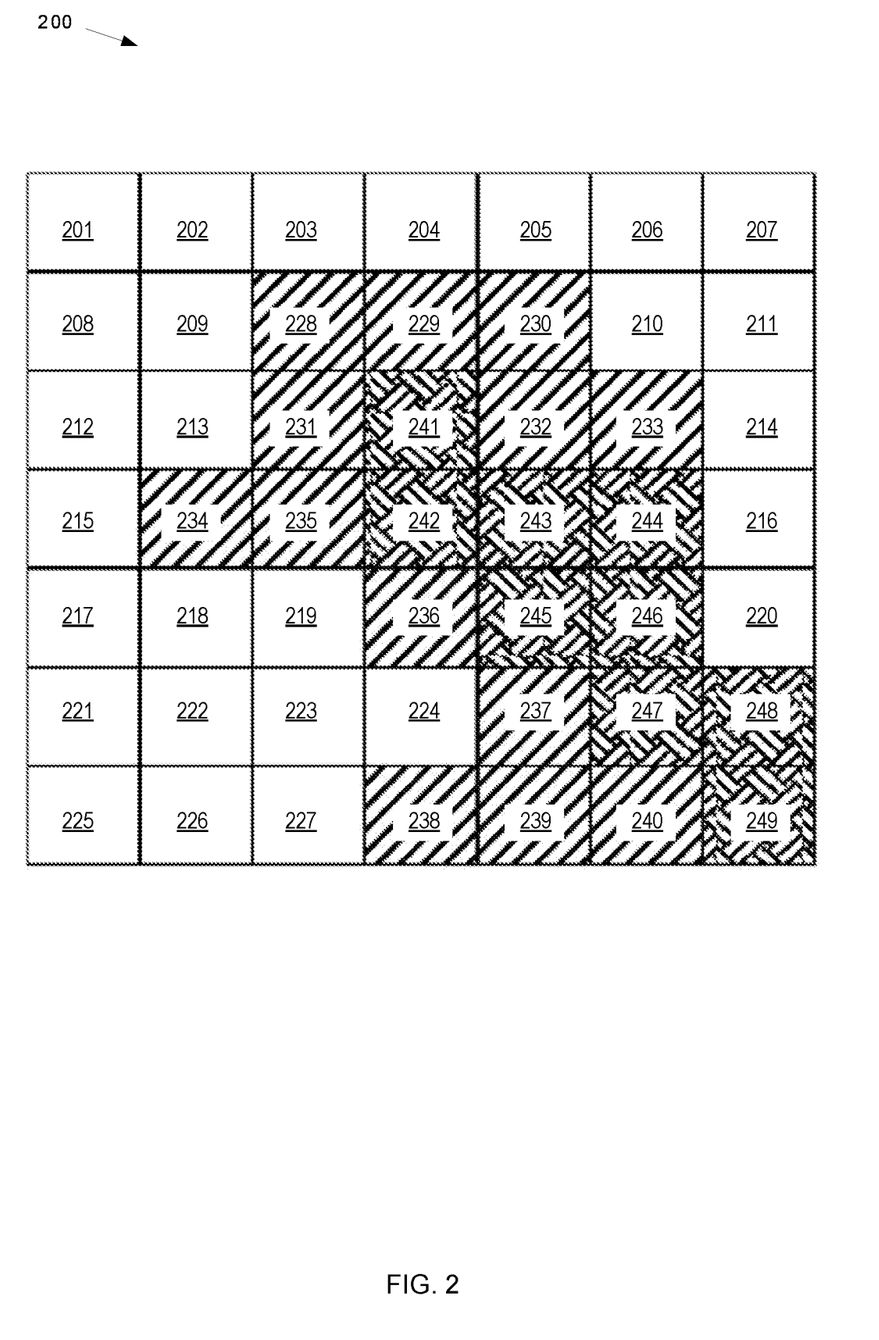
FIG. 2 depicts a visual representation of grid cells of a reservoir in a subterranean diffusion simulation, according to some embodiments.

FIG. 2 depicts a visual representation of grid cells of a reservoir in a subterranean diffusion simulation, according to some embodiments. A grid cell system 200 is rectangular and comprises 49 rectangular grid cells with seven rows and seven columns. The grid cells include lesser-diffusion grid cells 201-227, medium-diffusion grid cells 228-240, and greater-diffusion grid cells 241-249.

Each of the rows of the grid cell system 200 includes seven grid cells. From top to bottom in ascending order, the rows of the grid cell system 200 can be ordered as a first row, second row, third row, fourth row, fifth row, sixth row, and seventh row. The first row of the grid cell system 200 includes the lesser-diffusion grid cells 201-207. The second row of the grid cell system 200 includes the lesser-diffusion grid cells 208-209, the medium-diffusion grid cells 228-230, and the lesser-diffusion grid cells 210-211. The third row of the grid cell system 200 includes the lesser-diffusion grid cells 212-213, the medium-diffusion grid cell 231, the greater-diffusion grid cell 241, the medium-diffusion grid cells 232-233, and the lesser-diffusion grid cell 214. The fourth row of the grid cell system 200 includes the lesser-diffusion grid cell 215, the medium-diffusion grid cells 234-235, the greater-diffusion grid cells 242-244, and the lesser-diffusion grid cell 216. The fifth row of the grid cell system 200 includes the lesser-diffusion grid cells 217-219, the medium-diffusion grid cell 236, the greater-diffusion grid cell 245-246, and the lesser-diffusion grid cell 220. The sixth row of the grid cell system 200 includes the lesser-diffusion grid cell 221-224, the medium-diffusion grid cell 237, and the greater-diffusion grid cell 247-248. The seventh row of the grid cell system 200 includes the lesser-diffusion grid cell 225-227, the medium-diffusion grid cells 238-240, and the greater-diffusion grid cell 249.

The diffusive flux of each of the grid cells can be described as lesser, medium, or greater relative to each other and without limiting any diffusive flux to being less than, approximately equal to, or greater than a fixed value of flux. The diffusive flux of the lesser-diffusion grid cells 201-227 can be less than the diffusive flux of any of the medium-diffusion grid cells 228-240 or the greater-diffusion grid cells 241-249. The diffusive flux of each of the medium-diffusion grid cells 228-240 are greater than the diffusive flux of any of the lesser-diffusion grid cells 201-227 and less than the diffusive flux of any of the greater-diffusion grid cells 241-249. The diffusive flux of each of the greater-diffusion grid cells 241-249 are greater than the diffusive flux of any of the lesser-diffusion grid cells 201-227 or the medium-diffusion grid cells 228-240.

For example, the diffusive flux of each of the lesser-diffusion grid cells 201-227 can be in a range of one to less than 10 kilograms per meter-squared second ($kg/m^2$-s). The diffusive flux of each of the medium-diffusion grid cells 228-240 can be in a range of 10 to less than 100 $kg/m^2$-s. The diffusive flux of each of the greater-diffusion grid cells 241-249 can be fluxes equal to or greater than 100 $kg/m^2$-s.

In some embodiments, a grid cell can be represented in two dimensions by approximating the third dimension (e.g. height) to be equal for each grid cell. In such two-dimensional embodiments, each of the grid cells can be rectangular and of equal sizes. Alternatively, the grid cells can be non-equilateral quadrilaterals of different sizes. Grid cells of other reservoir simulations can be represented by other two-dimensional polygons, two-dimensional ellipsoids, voronoi grid cells, etc. In some embodiments, a grid cell can be represented in three dimensions by polyhedral shapes, three-dimensional ellipsoids, shapes combining curved and flat surfaces, etc. For example, a three-dimensional reservoir simulation system can include cube grid cells, hexagonal prism grid cells, dodecahedral grid cells, etc.

Example Operations

Operations are now described to reduce the time used to calculate molecular diffusion in a compositional reservoir simulation of gas injections in the fractured media, in order to reduce the total execution time of the simulation.

Figure 3:
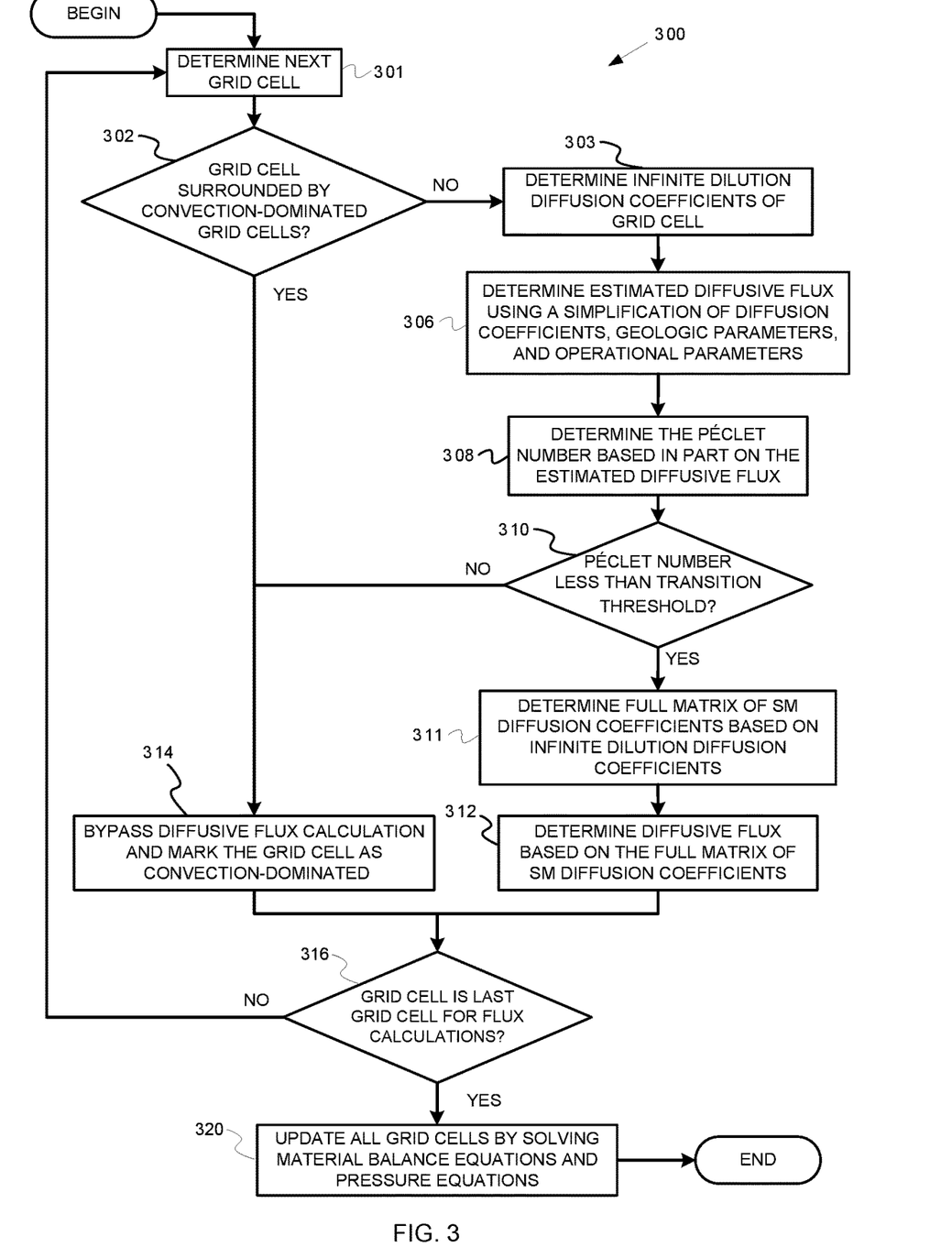
FIG. 3 depicts a flowchart to bypass diffusion calculations in a molecular diffusion simulation for grid cells of a reservoir that are dominated by convection flux, according to some embodiments.

FIG. 3 depicts a flowchart to bypass diffusion calculations in a molecular diffusion simulation for grid cells of a reservoir that are dominated by convection flux, according to some embodiments. Operations of a flowchart 300 can dynamically track transition zones, where diffusion is more effective or dominant, and avoids calculations in convection-dominated regions. Decreasing total time of simulation by skipping certain operations can be especially important for field cases at which there are regions where diffusion is dominated by convection. Operations of the flowchart 300 can be performed by software, hardware, firmware, or a combination thereof. For example, with reference to an example computer device depicted in FIG. 4 (further described below), a processor can execute instructions to perform operations of the flowchart 300. Operations of the flowchart 300 can be performed for any number of time intervals in a reservoir simulation system. Operations of the flowchart 300 begin at 301.

At block 301, the next grid cell is determined. In some embodiments, a reservoir simulation can include a plurality of grid cells. A tracking variable can be used to determine what grid cell is a next grid cell. For example, the reservoir simulation can include a grid cell index, wherein each index value of the grid cell index corresponds to a grid cell in the plurality of grid cells. Determining a next grid cell can include changing a tracking variable from a prior index value to a next index value. Operations at blocks 302-320 can then be applied to the grid cell corresponding with this next index value. For example, with reference to FIG. 2, if a tracking variable was originally equal to 201, determining a next grid cell can increase the tracking the variable to be equal to 202. In some embodiments, if the tracking variable was originally empty or non-existent, the tracking variable can change to an initial value in the range of the grid cell index. For instance, with reference to the example of FIG. 2, for a first iteration, the initial value of the tracking variable can be set to 201. Once operations at block 301 have completed, the next grid cell becomes the grid cell described below for operations at blocks 302-320.

At block 302, a determination is made of whether the grid cell is surrounded by convection-dominated grid cells. In some embodiments, a grid cell can be surrounded by neighboring grid cells. The neighboring grid cells can be identified to be in a convection-dominated flow regime (i.e. identified as a convection-dominated grid cell). For example, a neighboring grid cell can include a marking variable that marks the neighboring grid cell as a convection-dominated grid cell. Alternatively, or in addition, a neighboring grid cell can be determined to have a large Péclet number (i.e. greater than the transition threshold) and be determined to be a convection-dominated grid cell. In some embodiments, each diffusive flux through a surface of a convection-dominated grid cell is negligible compared to any convective flux through the surface of the convection-dominated grid cell. In some embodiments, if a grid cell is surrounded by convection-dominated grid cells, an assumption is made that all the faces of that grid cell have zero diffusive flux and can remain unchanged for the current operation. If all the faces of that grid cell have zero diffusive flux, then the diffusive flux does not need to be calculated and the initial infinite dilution diffusion coefficients can remain unchanged, wherein an infinite dilution diffusion coefficient of a component i is defined as a diffusion coefficient of the component i infinitely diluted in a second component gas.

For example, with reference to FIG. 2, the lesser-diffusion grid cell 222 has four neighboring grid cells. The four neighboring grid cells are the lesser-diffusion grid cells 218, 223, 226, and 221. If each of these lesser-diffusion grid cells are marked as convection dominated grid cells, then the operation can determine that lesser-diffusion grid cell 222 is determined to be surrounded by convection-dominated grid cells. If the grid cell is surrounded by convection-dominated grid cells, operations of the flowchart 300 continue at block 314 (which is further described below). If the grid cell is not surrounded by convection-dominated grid cells, operations of the flowchart 300 continue at block 303.

At block 303, the infinite dilution diffusion coefficients of the grid cell are determined. In some embodiments, the infinite dilution diffusion coefficients can be determined by cross-referencing known compounds and mixtures in the reservoir system with a data table. Alternatively, or in addition, the infinite dilution diffusion coefficients can be determined by matching equations of state with experimental fluid simulations. In some embodiments, the infinite dilution diffusion coefficients can be determined by setting them equal to an initial value, such as one or zero.

The diffusive flux can be determined using Equation 1 based on the auxiliary SM diffusion coefficients, $B^{SM}$, where φ is the porosity, the subscript a refers to a phase, $S_\alpha$ is the phase saturation, c is the molar density, $x_i$ is the composition of component i, $\mu_i$ is the chemical potential of component i, R is the universal gas constant, and T is the absolute temperature of the grid cell:

$$J_{\alpha,i} = -\frac{\phi S_\alpha c_\alpha}{RT} \sum_{j=1}^{n_c-1} (B^{SM})^{-1}_{\alpha,i,j} x_{\alpha,j} \nabla \mu_{\alpha,j} \quad i = 1, \ldots, n_c - 1 \quad (1)$$

In some embodiments, parameters such as porosity or temperature can be geologic parameters. A geologic parameter can be related to a property of the geologic media, rock, and/or hydrocarbon formation. A geologic parameter can be determined based on the results from a data table, from applying empirical relationships between measurable quantities and geologic properties, from sensor data, from simulations, etc.

In some embodiments, parameters such as molar density or phase saturation at an at an injection grid cell or grid cell face can be operational parameters. Operational parameters can be determined based on an input that corresponds with a physical operation at a well. For example, the molar density at a grid cell that corresponds with the location of an injection well can be determined based on a gas flux boundary condition set to a gas injection rate at the injection well. In some embodiments, a parameter can be both an operational parameter and a geologic parameter. For example, a grid cell can be determined to have an initial temperature and phase saturation based on geologic parameter data. The temperature and phase saturation can change as a result of a flux of injection gas at the grid cell to simulate an injection operation. Operational parameters can be based on equipment settings of pumps or other equipment at a reservoir. Alternatively, or in addition, operational parameters can be determined based on results from correlating parameters with an appropriate EOS, from sensor data, from parameters based on the results of a simulation, etc.

In some embodiments, the elements of the full matrix of auxiliary SM diffusion coefficients can be determined using Equations 2 and 3, where $B_{ij}^{SM}$ is an off-diagonal auxiliary SM diffusion coefficient, $B_{ii}^{SM}$ is a diagonal auxiliary SM diffusion coefficient, $n_c$ is the number of components, $D_{ik}$ is a SM diffusion coefficient of component i diluted in component k, $x_k$ is the composition of component k, and $D_{i,n_c}$ is the diffusion coefficient of component i diluted in the injected gas:

$$B_{ii}^{SM} = \frac{x_i}{D_{in_c}} + \sum_{\substack{k=1 \\ i \neq k}}^{n_c} \frac{x_k}{D_{ik}}, \quad i = 1, \ldots, n_c - 1 \quad (2)$$

$$B_{ij}^{SM} = -x_i \left( \frac{1}{D_{ij}} - \frac{1}{D_{in_c}} \right) \quad i, j = 1, \ldots, n_c - 1; i \neq j \quad (3)$$

In some embodiments, the SM diffusion coefficients can be determined by using the generalized Vignes equation for multi-component mixtures based on the infinite dilution coefficients. A form of the generalized Vignes equation is shown below in Equation 4 where $D_{ij}$ is the SM diffusion coefficient of the component pair i-j, $D_{ij}^\infty$ is the infinite diffusion coefficient of component i diluted in component j, $D_{ji}^\infty$ is the infinite dilution coefficient of component j diluted in component i, xi is the concentration of component i, and xj is the concentration of component j:

$$D_{ij} = (D_{ij}^\infty)^{x_i} (D_{ji}^\infty)^{x_j} \prod_{\substack{k=1 \\ k \neq i,j}}^{n} (D_{ik}^\infty D_{jk}^\infty)^{x_k/2} \quad (4)$$

In some embodiments, the SM diffusion coefficients can be replaced with other coefficients from other empirical equations, such as the Darken equation or by the Caldwell and Babb equation. In some embodiments, the SM diffusion coefficients can be replaced by diffusion coefficients determined by simulation results, such as simulation results based on molecular dynamics simulations.

At block 306, an estimated diffusive flux is determined using a simplification of the diffusion coefficients, geologic parameters, and operational parameters. In some embodiments, the diffusive flux can be determined based in part on a matrix of auxiliary Stefan-Maxwell (SM) diffusion coefficients. Two premises can be leveraged to simplify the calculations of the auxiliary SM diffusion coefficients to provide an estimated diffusive flux. In the first premise, it is assumed that the dominant diffusion of a component is due to the concentration gradient of that component alone so that only the diagonal elements of the diffusion coefficient matrix can be used instead of the whole matrix. The second premise depends on two assumptions, the first being that the diffusion coefficient of the gaseous phase is higher than the diffusion coefficient of the liquid phase so that the maximum diffusive flow happens in the gas phase and the second being that the gas composition quickly approaches that of the injected gas. These two assumptions can result in an assumption that the majority of diffusion is occurring at a gaseous phase with a composition that is approximately that of the injected gas composition.

The assumption above allows the determination of the auxiliary SM diffusion coefficients by using the approximation shown in Equation 5 below, where each value of $B_{ij}^{SM}$ is the auxiliary SM diffusion coefficients for any value of i and j, $D_{n,1}^\infty$ is the infinite diffusion coefficient of component n diluted in the injected gas, the values of $D_{i,1}^\infty$ is the infinite diffusion coefficient of component i diluted in the injected gas for any value of i, and $x_i$ is the concentration of component i:

$$\lim_{\substack{x_1 \to 1.0 \\ x_{i,i\neq 1} \to 0.0}} \begin{bmatrix} B_{11}^{SM} & \cdots & B_{1,n-1}^{SM} \\ \vdots & \ddots & \vdots \\ B_{n-1,1}^{SM} & \cdots & B_{n-1,n-1}^{SM} \end{bmatrix}^{-1} = \begin{bmatrix} D_{n,1}^\infty & \cdots & (D_{n,1}^\infty - D_{i,1}^\infty) & \cdots & 0 \\ & D_{2,1}^\infty & & & \\ \vdots & & \ddots & & \vdots \\ & & & D_{n-2,1}^\infty & \\ 0 & & \cdots & & D_{n-1,1}^\infty \end{bmatrix} \quad (5)$$

The elements of the matrix of infinite dilution diffusion coefficients can be determined from equation of state (EOS) properties derived from the matching of fluid experiments. Assuming that the infinite dilution diffusion coefficients between injected gas and other hydrocarbons in the oil are in the same order of magnitude, $(D_{n,i}^\infty - D_{i,1}^\infty)$ in the first row of Equation 1 can be given a negligible diffusive flux. If the off-diagonal elements give a negligible diffusive flux, calculation of the flux using the off-diagonal elements can be ignored. This can result in an approximation of Equation 5 into the form of Equation 6, wherein both the matrix including auxiliary SM diffusion coefficients and the matrix including infinite dilution diffusion coefficients are diagonal matrices:

$$\lim_{\substack{x_1 \to 1 \\ x_{i,i\neq 1} \to 0}} \begin{bmatrix} B_{11}^{SM} & \cdots & 0 \\ \vdots & \ddots & \vdots \\ 0 & \cdots & B_{n-1,n-1}^{SM} \end{bmatrix}^{-1} = \begin{bmatrix} D_{n,1}^\infty & \cdots & 0 & \cdots & 0 \\ \vdots & D_{2,1}^\infty & & & \vdots \\ 0 & & \ddots & & 0 \\ \vdots & & & D_{n-2,1}^\infty & \vdots \\ 0 & \cdots & 0 & \cdots & D_{n-1,1}^\infty \end{bmatrix} \quad (6)$$

Equation 6 can be used to provide an estimate of the inverse of an auxiliary SM diffusion coefficient. Equation 1 can be simplified by recognizing that when either simplification of the SM diffusion coefficients is employed, all of the elements of the matrix of auxiliary SM diffusion coefficients can be approximated as zero except in the case where i is equal to j, At block 308, the Péclet number is determined based in part on the estimated diffusive flux. The Péclet number can be calculated as a ratio of the convective flux to the estimated diffusive flux. The ratio of the convective flux to estimated diffusive flux can be determined for each grid cell using Equation 7 below:

$$N_{Pe} \equiv \frac{\text{Convective flux}}{\text{Diffusive flux}} \quad (7)$$

In some embodiments, the convective flux can be determined from one or more boundary conditions of the grid cell. For example, at grid cell 249, a boundary condition could set the convective flux of right side at 30 kg/m²-s. In some embodiments, the boundary condition can be set at block 308. Alternatively, the boundary condition can be set at block 306 based on an operational parameter. Alternatively, or in addition, a convective flux could be determined during the determination of fluxes in block 312 or block 314, described further below.

At block 310, a determination is made of whether the Péclet number is less than a transition threshold. The transition threshold can be of any value greater than one. In some embodiments, the transition threshold can be five. If the Péclet number of the grid cell is less than the transition threshold, the flow at the grid cell is considered diffusion-dominated. If the Péclet number of the grid cell is greater than or equal to the transition threshold, the flow at the grid cell is considered convection-dominated. If the Péclet number of the grid cell is less than the transition threshold, operations of the flowchart 300 continue at block 311. Otherwise, operations of the flowchart 300 continue at block 314.

At block 311, the full matrix of the SM diffusion coefficients is determined based on the infinite dilution diffusion coefficients. In some embodiments, the full matrix of the SM diffusion coefficients can be determined by using a combination of Equations 2, 3, and 4.

At block 312, a full diffusive flux is determined based on the full matrix of SM diffusion coefficients. The full diffusive flux can be determined based on a full matrix of auxiliary SM diffusion coefficients. The elements of the full matrix of auxiliary SM diffusion coefficients can be determined using Equations 2 and 3. The full diffusive flux can then be determined using Equation 1 based on the elements of the full matrix of auxiliary SM diffusion coefficients.

At block 314, the full diffusive flux calculation is bypassed and the grid cell is marked as convection-dominated. In some embodiments, the full diffusive flux calculations can be bypassed by not determining the diffusive flux based on the full matrix of SM diffusion coefficients. In some embodiments, marking the grid cell as convection-dominated can include setting a marking variable associated with the grid cell that will mark the grid cell as a convection-dominated grid cell. For example, with respect to FIG. 2, marking the lesser-diffusion grid cell 208 as convection-dominated can include setting a marking variable to "CONVECTION."

At block 316, a determination is made of whether the grid cell is the last grid cell for flux calculations. In some embodiments, determining that a grid cell is the last grid cell for flux calculations can include determining that a limit of the grid cell index array has been reached. For example, with reference to FIG. 2, a limit of the grid cell index array can be 349. If the tracking variable is 349, the operation can determine that a limit of the grid cell index array has been reached. In some embodiments, determining that a grid cell is the last grid cell for flux calculations can include determining that a predetermined grid cell limit has been reached. For example, with reference to FIG. 2, the grid cell 220 can be a predetermined grid cell limit. If the tracking variable is 220, then the predetermined grid cell limit has been reached. If the grid cell is not the last grid cell for flux calculations, operations of the flowchart 300 continue at block 301. Otherwise, operations of the flowchart 300 continue at block 320.

At block 320, all the grid cells are updated by solving material balance equations and pressure equations. In some embodiments, the material balance equations and pressure equations can be solved to provide convective fluxes of all the grid cells and/or other reservoir parameters. For example, the material balance equations and pressure equations can be solved to provide parameters such as temperature, pressure, phase compositions, changes thereof, etc. In some embodiments, the results of the material balance equations and pressure equations can be used to determine a quantity of hydrocarbon that is recovered through one or more production wells. For example, with reference to FIG. 1, changing the conditions of a grid cell to reflect a plurality of settings of operational parameters such as injection rate or gas composition controlled by the injection system 108 can result in a plurality of estimates of the hydrocarbon recovered from the production well 103.

In some embodiments, the infinite dilution diffusion coefficients and/or SM diffusion coefficients can be set for a future iteration based on the solutions to the material balance equations and pressure equations during an updating procedure. Additionally, the infinite dilution diffusion coefficients and/or SM diffusion coefficients of grid cells that are surrounded by convection-dominated grid cells can be skipped by the updating procedure. Operations of the flowchart 300 are complete.

In some embodiments, operations and output from the flowchart 300 can be used in actual gas injection operations or well location planning. For example, changing an operational parameter such as a gas injection rate of the injected gas can change the convective flux boundary conditions of grid cells. Changing the convective flux boundary conditions of grid cells can result in different estimated oil recovery. In some embodiments, the correlation between the operational parameters and the estimated oil recovery can be used to determine optimal operational parameters. For example, operational parameters such as the gas injection schedule, gas injection rate, composition of an injected gas, etc. can be optimized. The parameter or set of parameters that result in a maximum estimated oil recovery or greatest rate of estimated oil recovery can be selected as the optimal operational parameters for oil recovery at the well. In some embodiments, the correlation between geologic parameters and the estimated oil recovery can be used to optimize locations at which to drill at least one of a production well and a gas injection well. For example, selecting different grid cells as production well positions or injection well positions can provide different estimates of oil recovery based on the geologic parameters at or near the grid cell. An optimal production well position or injection well position can be determined based on a maximum estimated oil recovery.

The flowchart is provided to aid in understanding the illustrations and are not to be used to limit the scope of the claims. The flowchart depicts example operations that can vary within the scope of the claims. Additional operations can be performed; fewer operations can be performed; the operations can be performed in parallel; and the operations can be performed in a different order. It will be understood that at least some of blocks of the flowchart illustrations and/or block diagrams, and combinations of blocks in the flowchart illustrations and/or block diagrams, can be implemented by program code. The program code can be provided to a processor of a general purpose computer, special purpose computer, or other programmable machine or apparatus.

Example Computer Device

Figure 4:
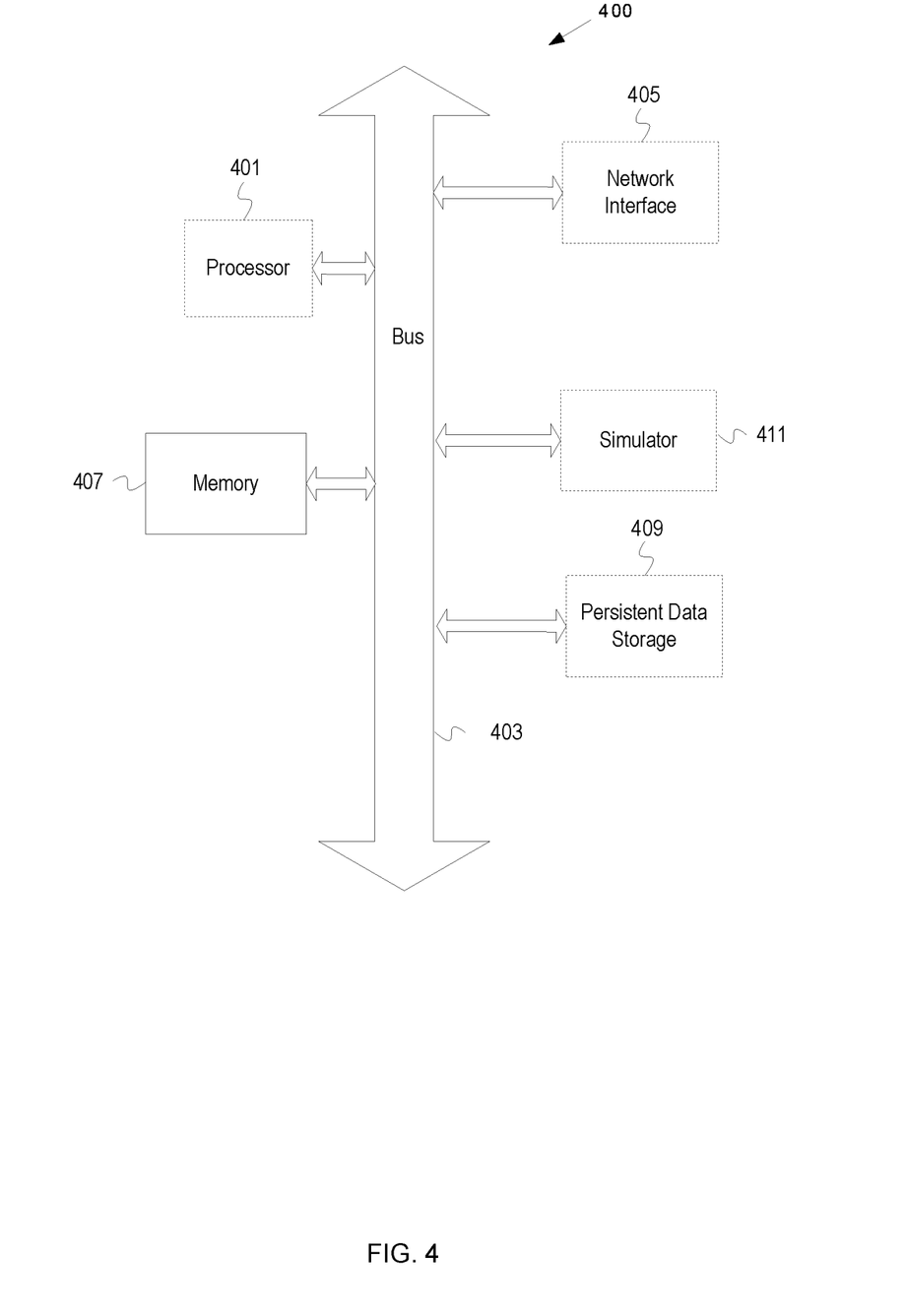
FIG. 4 depicts an example computer device, according to some embodiments.

FIG. 4 depicts an example computer device, according to some embodiments. The computer device 400 depicted in FIG. 4 can be an example of at least part of the computing subsystem 110 depicted in FIG. 1. The computer device 400 includes a processor 401 (possibly including multiple processors, multiple cores, multiple nodes, and/or implementing multi-threading, etc.). The computer device 400 includes memory 407. The memory 407 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer device 400 also includes a persistent data storage 409. The persistent data storage 409 can be a hard disk drive, such as magnetic storage device. The computer device 400 also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.).

The computer device 400 also includes a simulator 411. The simulator 411 can perform simulation operations, as described above. Any one of the previously described functionalities can be partially (or entirely) implemented in hardware and/or on the processor 401. For example, the functionality can be implemented with an application specific integrated circuit, in logic implemented in the processor 401, in a co-processor on a peripheral device or card, etc. Further, realizations can include fewer or additional components not illustrated in FIG. 4 (e.g., video cards, audio cards, additional network interfaces, peripheral devices, etc.). The processor 401, the network interface 405, and the persistent data storage 409 are coupled to the bus 403. Although illustrated as being coupled to the bus 403, the memory 407 can be coupled to the processor 401.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized herein. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine-readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine-readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing. Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. Many variations, modifications, additions, and improvements are possible.

Plural instances can be provided for components, operations or structures described herein as a single instance. Finally, boundaries between various components, operations and data stores are somewhat arbitrary, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

EXAMPLE EMBODIMENTS

Example embodiments include the following:

Embodiment 1

A method comprising: creating a diffusion model for a simulation of hydrocarbon recovery from a reservoir having a plurality of fractures during injection of an injected gas into the plurality of fractures, wherein the reservoir is partitioned into a plurality of grid cells in the diffusion model, wherein creating the diffusion model for a grid cell of the plurality of grid cells comprises, determining a flux ratio of a convective flux to an estimated diffusive flux for the grid cell; determining whether the flux ratio is less than a threshold; and in response to determining that the flux ratio is less than the threshold, determining a full diffusive flux for the grid cell for inclusion in the diffusion model; and performing the simulation of the hydrocarbon recovery from the reservoir based on the diffusion model.

Embodiment 2

The method of Embodiment 1, wherein creating the diffusion model for the grid cell comprises: determining whether the grid cell is surrounded by other grid cells having the flux ratio greater than the threshold; and in response to determining that the grid cell is surrounded by other grid cells having the flux ratio greater than the threshold, bypassing determination of the full diffusive flux for the grid cell for the diffusion model.

Embodiment 3

The method of Embodiments 1 or 2, wherein in response to determining that the grid cell is surrounded by other grid cells having the flux ratio greater than the threshold, applying previously determined values of diffusion coefficients for the grid cell.

Embodiment 4

The method of any of Embodiments 1-3, wherein creating the diffusion model for the grid cell comprises: in response to determining that the flux ratio is greater than or equal to the threshold, bypassing determination of the full diffusive flux for the grid cell for the diffusion model.

Embodiment 5

The method of any of Embodiments 1-4, wherein in response to determining that the flux ratio is greater than or equal to the threshold, applying previously determined values of diffusion coefficients for the grid cell.

Embodiment 6

The method of any of Embodiments 1-5, wherein creating the diffusion model comprises creating a molecular diffusion model.

Embodiment 7

The method of any of Embodiments 1-6, wherein creating the diffusion model for the grid cell comprises determining the estimated diffusive flux, wherein determining the estimated diffusive flux comprises: determining an infinite dilution diffusion coefficient for each pair of non-injected gas and injected gas components in the grid cell of the simulated volume of the reservoir.

Embodiment 8

The method of any of Embodiments 1-7, wherein determining the estimated diffusive flux comprises: setting the difference between each two infinite dilution diffusion coefficients determined for each pair of non-injected gas and injected gas components to zero.

Embodiment 9

The method of any of Embodiments 1-8, further comprising: drilling at least one of an injection well and a production well in the reservoir at a location that is based, at least in part, on a result of the simulation.

Embodiment 10

The method of any of Embodiments 1-9, further comprising: recovering hydrocarbons from the reservoir via a production well based on injection of the injected gas into an injection well at a rate that is based, at least in part, on a result of the simulation.

Embodiment 11

The method of any of Embodiments 1-10, further comprising: recovering hydrocarbons from the reservoir via a production well based on injection of the injected gas into an injection well, wherein a composition of the injected gas that is based, at least in part, on a result of the simulation.

Embodiment 12

One or more non-transitory machine-readable storage media comprising program code for a simulation of hydrocarbon recovery, the program code to: create a diffusion model for the simulation of the hydrocarbon recovery from a reservoir having a plurality of fractures during injection of an injected gas into the plurality of fractures, wherein the reservoir is partitioned into a plurality of grid cells in the diffusion model, wherein the program code to create the diffusion model for a grid cell of the plurality of grid cells comprises program code to, determine whether the grid cell is surrounded by other grid cells having a flux ratio of a convective flux to an estimated diffusive flux greater than a threshold; in response to a determination that the grid cell is surrounded by other grid cells having the flux ratio greater than the threshold, bypass determination of a full diffusive flux for the grid cell for the diffusion model; determine the flux ratio for the grid cell; determine whether the flux ratio for the grid cell is less than the threshold; and in response to a determination that the flux ratio for the grid cell is less than the threshold, determine the full diffusive flux for the grid cell for inclusion in the diffusion model; and perform the simulation of the hydrocarbon recovery from the reservoir based on the diffusion model.

Embodiment 13

The one or more non-transitory machine-readable storage media of Embodiment 12, wherein the program code comprises program code to: in response to the determination that the grid cell is surrounded by other grid cells having the flux ratio greater than the threshold, apply previously determined values of diffusion coefficients for the grid cell.

Embodiment 14

The one or more non-transitory machine-readable storage media of Embodiments 12 or 13, wherein the program code to create the diffusion model for the grid cell comprises program code to: in response to a determination that the flux ratio is greater than or equal to the threshold, bypass determination of the full diffusive flux for the grid cell for the diffusion model.

Embodiment 15

The one or more non-transitory machine-readable storage media of any of Embodiments 12-14, wherein the program code comprises program code to: in response to the determination that the flux ratio is greater than or equal to the threshold, apply previously determined values of diffusion coefficients for the grid cell.

Embodiment 16

A system comprising: a processor; and a machine-readable medium having program code executable by the processor to cause the processor to, create a diffusion model for a simulation of hydrocarbon recovery from a reservoir having a plurality of fractures during injection of an injected gas into the plurality of fractures, wherein the reservoir is partitioned into a plurality of grid cells in the diffusion model, wherein the program code to cause the processor to create the diffusion model for a grid cell of the plurality of grid cells comprises program code executable by the processor to cause the processor to, determine a flux ratio of a convective flux to an estimated diffusive flux for the grid cell; determine whether the flux ratio is less than a threshold; and in response to a determination that the flux ratio is less than the threshold, determine a full diffusive flux for the grid cell for inclusion in the diffusion model; and perform the simulation of the hydrocarbon recovery from the reservoir based on the diffusion model.

Embodiment 17

The system of Embodiment 16, wherein the program code executable by the processor to cause the processor to create the diffusion model for the grid cell comprises program code executable by the processor to cause the processor to: determine whether the grid cell is surrounded by other grid cells having the flux ratio greater than the threshold; and in response to a determination that the grid cell is surrounded by other grid cells having the flux ratio greater than the threshold, bypass determination of the full diffusive flux for the grid cell for the diffusion model.

Embodiment 18

The system of Embodiments 16 or 17, wherein the program code executable by the processor to cause the processor to create the diffusion model for the grid cell comprises program code executable by the processor to cause the processor to: in response to a determination that the flux ratio is greater than or equal to the threshold, bypass determination of the full diffusive flux for the grid cell for the diffusion model; and apply previously determined values of diffusion coefficients for the grid cell.

Embodiment 19

The system of any of Embodiments 16-18, further comprising: an injection pump to pump the injected gas at a rate down an injection well to produce hydrocarbons from the reservoir, wherein the rate is based, at least in part, on a result of the simulation.

Embodiment 20

The system of any of Embodiments 16-19, wherein a composition of the injected gas to be pumped by the injection pump that is based, at least in part, on a result of the simulation.

What is claimed is:

1. A method comprising:
   creating a diffusion model for a simulation of hydrocarbon recovery from a reservoir having a plurality of fractures during injection of an injected gas into the plurality of fractures, wherein the reservoir is partitioned into a plurality of grid cells in the diffusion model, wherein creating the diffusion model for a grid cell of the plurality of grid cells comprises, determining a flux ratio of a convective flux to an estimated diffusive flux for the grid cell;
   determining whether the flux ratio is less than a threshold;
   in response to determining that the flux ratio is less than the threshold, determining a full diffusive flux for the grid cell for inclusion in the diffusion model;
   performing the simulation of hydrocarbon recovery from the reservoir based on the diffusion model.

2. The method of claim 1, wherein creating the diffusion model for the grid cell comprises:
   determining whether the grid cell is surrounded by other grid cells having the flux ratio greater than the threshold; and
   in response to determining that the grid cell is surrounded by other grid cells having the flux ratio greater than the threshold, bypassing determination of the full diffusive flux for the grid cell for the diffusion model.

3. The method of claim 2, wherein in response to determining that the grid cell is surrounded by other grid cells having the flux ratio greater than the threshold, applying previously determined values of diffusion coefficients for the grid cell.

4. The method of claim 1, wherein creating the diffusion model for the grid cell comprises: in response to determining that the flux ratio is greater than or equal to the threshold, bypassing determination of the full diffusive flux for the grid cell for the diffusion model.

5. The method of claim 4, wherein in response to determining that the flux ratio is greater than or equal to the threshold, applying previously determined values of diffusion coefficients for the grid cell.

6. The method of claim 1, wherein creating the diffusion model comprises creating a molecular diffusion model.

7. The method of claim 1, wherein creating the diffusion model for the grid cell comprises determining the estimated diffusive flux, wherein determining the estimated diffusive flux comprises:
   determining an infinite dilution diffusion coefficient for each pair of non-injected gas and injected gas components in the grid cell of a simulated volume of the reservoir.

8. The method of claim 7, wherein determining the estimated diffusive flux comprises:
   setting a difference between each two infinite dilution diffusion coefficients determined for each pair of non-injected gas and injected gas components to zero.

9. The method of claim 1, further comprising:
   drilling at least one of an injection well and a production well in the reservoir at a location that is based, at least in part, on a result of the simulation.

10. The method of claim 1, further comprising:
    recovering hydrocarbons from the reservoir via a production well based on injection of the injected gas into an injection well at a rate that is based, at least in part, on a result of the simulation.

11. The method of claim 1, further comprising: recovering hydrocarbons from the reservoir via a production well based on injection of the injected gas into an injection well, wherein a composition of the injected gas is based, at least in part, on a result of the simulation.

12. One or more non-transitory machine-readable storage media comprising program code for a simulation of hydrocarbon recovery, the program code to:
    create a diffusion model for the simulation of hydrocarbon recovery from a reservoir having a plurality of fractures during injection of an injected gas into the plurality of fractures, wherein the reservoir is partitioned into a plurality of grid cells in the diffusion model, wherein the program code to create the diffusion model for a grid cell of the plurality of grid cells comprises program code to:
    determine whether the grid cell is surrounded by other grid cells having a flux ratio of a convective flux to an estimated diffusive flux greater than a threshold;
    in response to a determination that the grid cell is surrounded by other grid cells having the flux ratio greater than the threshold, bypass determination of a full diffusive flux for the grid cell for the diffusion model;
    determine the flux ratio for the grid cell;
    determine whether the flux ratio for the grid cell is less than the threshold;
    in response to a determination that the flux ratio for the grid cell is less than the threshold, determine the full diffusive flux for the grid cell for inclusion in the diffusion model; and
    perform the simulation of hydrocarbon recovery from the reservoir based on the diffusion model.

13. The one or more non-transitory machine-readable storage media of claim 12, wherein the program code comprises program code to:
    in response to the determination that the grid cell is surrounded by other grid cells having the flux ratio greater than the threshold, apply previously determined values of diffusion coefficients for the grid cell.

14. The one or more non-transitory machine-readable storage media of claim 12, wherein the program code to create the diffusion model for the grid cell comprises program code to:
    in response to a determination that the flux ratio is greater than or equal to the threshold, bypass determination of the full diffusive flux for the grid cell for the diffusion model.

15. The one or more non-transitory machine-readable storage media of claim 14, wherein the program code comprises program code to:
    in response to the determination that the flux ratio is greater than or equal to the threshold, apply previously determined values of diffusion coefficients for the grid cell.

16. A system comprising:
a processor; and a machine-readable medium having program code executable by the processor to cause the processor to create a diffusion model for a simulation of hydrocarbon recovery from a reservoir having a plurality of fractures during injection of an injected gas into the plurality of fractures, wherein the reservoir is partitioned into a plurality of grid cells in the diffusion model, wherein the program code to cause the processor to create the diffusion model for a grid cell of the plurality of grid cells comprises program code executable by the processor to cause the processor to:
determine a flux ratio of a convective flux to an estimated diffusive flux for the grid cell;
determine whether the flux ratio is less than a threshold;
in response to a determination that the flux ratio is less than the threshold, determine a full diffusive flux for the grid cell for inclusion in the diffusion model; and
perform the simulation of hydrocarbon recovery from the reservoir based on the diffusion model.

17. The system of claim 16, wherein the program code executable by the processor to cause the processor to create the diffusion model for the grid cell comprises program code executable by the processor to cause the processor to:
determine whether the grid cell is surrounded by other grid cells having the flux ratio greater than the threshold; and
in response to a determination that the grid cell is surrounded by other grid cells having the flux ratio greater than the threshold, bypass determination of the full diffusive flux for the grid cell for the diffusion model.

18. The system of claim 16, wherein the program code executable by the processor to cause the processor to create the diffusion model for the grid cell comprises program code executable by the processor to cause the processor to:
in response to a determination that the flux ratio is greater than or equal to the threshold, bypass determination of the full diffusive flux for the grid cell for the diffusion model; and
apply previously determined values of diffusion coefficients for the grid cell.

19. The system of claim 16, further comprising:
an injection pump to pump the injected gas at a rate down an injection well to produce hydrocarbons from the reservoir, wherein the rate is based, at least in part, on a result of the simulation.

20. The system of claim 19, wherein a composition of the injected gas to be pumped by the injection pump is based, at least in part, on a result of the simulation.

* * * * *

UNITED STATES PATENT AND TRADEMARK OFFICE
CERTIFICATE OF CORRECTION

| | |
|---|---|
| PATENT NO. | : 10,900,330 B2 |
| APPLICATION NO. | : 16/334416 |
| DATED | : January 26, 2021 |
| INVENTOR(S) | : Saeedeh Mohebbinia and Terry Wang Wong |

It is certified that error appears in the above-identified patent and that said Letters Patent is hereby corrected as shown below:

In the Specification

Column 9, Line 64, the phrase reading:
-equal to j,-
Should read:
--equal to j.--

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*